United States Patent [19]

Fukutomi

[11] Patent Number: 5,519,705
[45] Date of Patent: May 21, 1996

[54] ROUTER FOR ESTABLISHING CONNECTION AMONG A PLURALITY OF LANS

[75] Inventor: Shoji Fukutomi, Hiratsuka, Japan

[73] Assignee: The Furukawa Electric Co., Ltd., Tokyo, Japan

[21] Appl. No.: 375,640

[22] Filed: Jan. 20, 1995

[30] Foreign Application Priority Data

Jan. 26, 1994  [JP]  Japan .................................... 6-006758

[51] Int. Cl.$^6$ .................................................. H04L 12/46
[52] U.S. Cl. ......................... 370/85.13; 370/60; 379/220
[58] Field of Search ........................ 370/60, 60.1, 85.13, 370/85.14, 94.1, 94.2, 94.3, 97; 379/220

[56] References Cited

U.S. PATENT DOCUMENTS

| | | | |
|---|---|---|---|
| 4,975,906 | 12/1990 | Takiyasu et al. | 370/85.13 |
| 5,060,228 | 10/1991 | Tsutsui et al. | 370/85.13 |
| 5,179,555 | 1/1993 | Videlock et al. | 370/85.13 |
| 5,329,527 | 7/1994 | Ujihashi et al. | 370/85.13 |
| 5,351,237 | 9/1994 | Shiohara et al. | 370/85.13 |
| 5,361,259 | 11/1994 | Hunt et al. | 370/85.13 X |

*Primary Examiner*—Hassan Kizou
*Attorney, Agent, or Firm*—Frishauf, Holtz, Goodman, Langer & Chick

[57] ABSTRACT

To transmit a data frame between different LANs, a connection is established, through a switching network, between routers respectively connected to the LAN's. The data frame is then forwarded from a source router to a destination router through the established connection. When a data frame is received from a LAN-side transmitter-receiver section in the source router, a network layer section samples from a routing table, according to the destination address included in the data frame, an address of the destination router, and samples a telephone number index corresponding to this gateway from a destination number table. A communication network line control section samples a telephone number corresponding to this index from a telephone number table, places a call in accordance with this telephone number, thereby connecting lines of the communication network, and automatically relays the frame from a LAN-side transmitter-receiver section to a destination LAN through the lines.

2 Claims, 4 Drawing Sheets

ROUTER FOR ESTABLISHING CONNECTION AMONG A PLURALITY OF LANS

BACKGROUND OF THE INVENTION

1. Field of the Invention

The present invention relates to a data repeating apparatus in which local area networks (LANs) are connected through a communication network so that a frame is relayed between the LANs.

2. Description of the Related Art

Conventionally, in relaying a frame-form network layer data to other networks through lines of a communication network, a call should be established between the networks for the data relay. This requires use of telephone number data.

In a conventional repeating apparatus, sets of destination address data for network layer data and telephone number data are prepared corresponding to the number of network layer addresses which require relay or repetition. First, the repeating apparatus retrieves a corresponding telephone number in accordance with destination addresses of the network layer data to be relayed. Then, the apparatus establishes a call in accordance with the retrieved telephone number, and connects with the other side of the network layer address through lines of a communication network, thereby effecting data relay with the remote side.

In this repeating apparatus, the telephone numbers must be set in a table therein in a manner such that they correspond to all the network layer addresses which require data communication. If connection with the network layer addresses is actually prevented by a change of network topology or the like, moreover, the repeating apparatus inevitably undergoes operation for unnecessary line connection with the remote side. In order to prevent this unnecessary line connection, in the repeating apparatus, the telephone numbers must be set manually.

SUMMARY OF THE INVENTION

The present invention has been contrived in consideration of these circumstances, and an object of the invention is to provide a data repeating apparatus in which a frame can be relayed automatically by providing sets of telephone numbers and network layer addresses for only those ends which are connected directly.

Another object of the invention is to provide a data repeating apparatus capable of coping with a change of network topology without requiring manual operation.

The above objects are achieved by a data repeating apparatus according to the present invention. In this repeating apparatus, a plurality of networks are connected through a communication network so that frame-form data (hereinafter referred to as "frame") is relayed between the networks. The data repeating apparatus comprises: first storage means loaded with address data of a remote-side repeating apparatus which is a gateway corresponding to data for destination addresses, including destination network addresses and destination terminal station addresses, which are directly connectable through the communication network; second storage means loaded with the number (telephone number) of the communication network corresponding to the address data of the remote-side gateway; sampling means adapted to sample from the first storage means the address data of the remote-side repeating apparatus corresponding to a frame for repetition when the repetition frame is received; line control means for sampling the telephone number of the communication network corresponding to the address data from the second storage means and connecting lines of the communication network in accordance with the sampled telephone number; and communication-network-side transmitter-receiver means for relaying the data to a destination network through the connected lines.

According to the data repeating apparatus described above, when the frame for repetition is received from the LAN-side transmitter-receiver means, the sampling means samples the address data of the gateway corresponding to the destination address data of the frame, and the line control means samples the telephone number of the communication network corresponding to the address data of the gateway, and gives a call in accordance with this telephone number, thereby connecting lines of the communication network. Further, the line control means relays the frame to a destination network through the connected lines. Thus, the frame can be automatically relayed to the destination network by providing sets of telephone numbers and network layer addresses for only those ends which are connected directly through the communication network.

Preferably, the first storage means includes a first table loaded with the address data of the remote-side repeating apparatus corresponding to the data for the directly connectable destination addresses, and a second table loaded with data for indexes corresponding to the address data of the repeating apparatus, and the second storage means is loaded with the telephone number of the communication network corresponding to the data for the indexes, and carries out data retrieval.

Preferably, moreover, the sampling means rewrites the address data of the repeating apparatus, stored in the first storage means, in accordance with information for the modification of network topology fetched through the communication network. Thus, the modification can be coped with automatically.

DETAILED DESCRIPTION OF THE PREFERRED EMBODIMENTS

Figure 1:
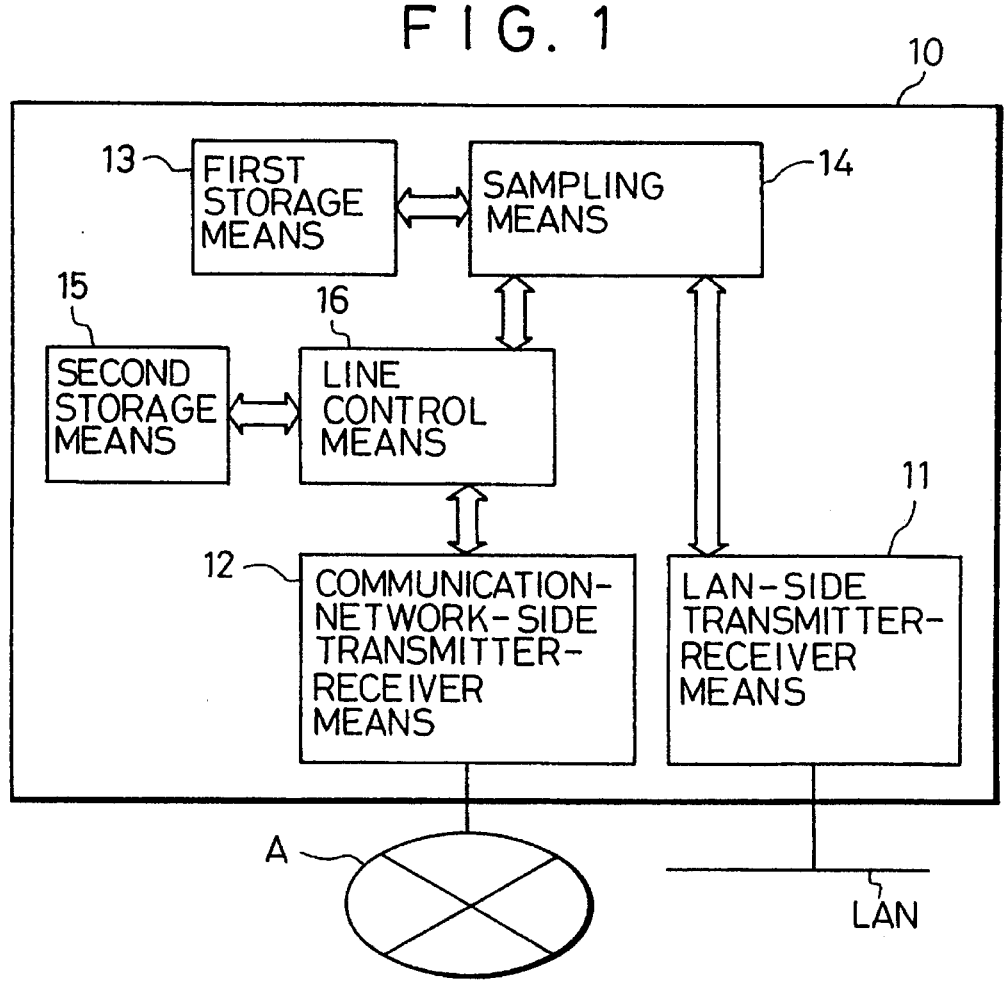
FIG. 1 is a principle diagram of a data repeating apparatus according to the present invention.

Referring now to the drawings of FIGS. 1 to 5, embodiments of a data repeating apparatus according to the present invention will be described.

FIG. 1 is a principle diagram of the data repeating apparatus according to the invention.

Referring to FIG. 1, a data repeating apparatus (hereinafter referred to as "router") 10 is connected to a LAN through a LAN-side transmitter-receiver means 11, and is also connected to a communication network A through a communication-network-side transmitter-receiver means 12. A plurality of terminal stations (hereinafter referred to as "nodes," not shown) are connected to the LAN. Each of these nodes transfers data frames to and from other nodes in the same LAN or nodes in other LANs through the communication network A.

Figure 2:
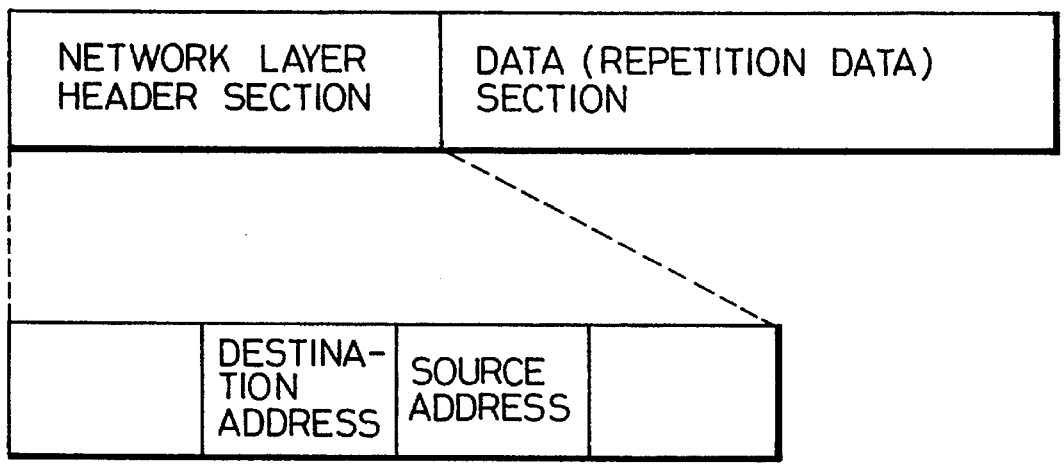
FIG. 2 shows a format of a frame transferred on a LAN.

As shown in FIG. 2, the format of a frame transferred on the LAN is composed of a network layer header section and a data section (repetition data section for the case of data repetition). The network layer header section is composed of a destination address and a source address subsequent thereto and various flags, control data, etc. The destination address includes a destination network as a destination of the frame concerned, address data for the destination node, etc. The source address includes a source network as a source of the frame concerned, address data for the source node, etc.

The router 10 comprises the LAN-side transmitter-receiver means 11, the communication-network-side transmitter-receiver means 12, first storage means 13, sampling means 14, second storage means 15, and line control means 16.

The first storage means 13 is loaded with address data (hereinafter referred to as "routing information") for a remote-side gateway (router) corresponding to the destination network address, and is connected to the sampling means 14.

The sampling means 14 is connected to the LAN-side transmitter-receiver means 11, first storage means 13, and line control means 16. The sampling means 14 samples address data for the corresponding gateway in accordance with data in the destination network address of the network layer header section which is received from the LAN-side transmitter-receiver means 11.

The second storage means 15 is loaded with telephone numbers corresponding to addresses of gateways which are connected directly through the communication network A, and is connected to the line control means 16.

The line control means 16 samples a corresponding telephone number from the second storage means 15 in accordance with gateway address data inputted from the sampling means 14. Also, the control means 16 carries out line control to connect lines of the communication network A in accordance with the sampled telephone number.

On receiving a frame from the LAN side, the LAN-side transmitter-receiver means 11 in the router 10 fetches data for the network layer header section from the frame, and delivers it to the sampling means 14. On fetching the network layer header section from the LAN-side transmitter-receiver means 11, the sampling means 14 searches the first storage means 13 in accordance with the destination network address of the fetched network layer header section. Then, the sampling means 14 samples a remote-side gateway address corresponding to the destination network address, and orders the line control means 16 to relay the received frame.

When supplied with the gateway address from the sampling means 14, the line control means 16 searches the second storage means 15 in accordance with it. Moreover, the control means 16 fetches a telephone number corresponding to this gateway address, gives a call to the owner of this telephone number, thereby establishing a data link, and then delivers the frame to the communication-network-side transmitter-receiver means 12. On fetching the frame from the control means 16, the transmitter-receiver means 12 transmits it to a gateway (not shown) connected thereto through the communication network A.

Figure 3:
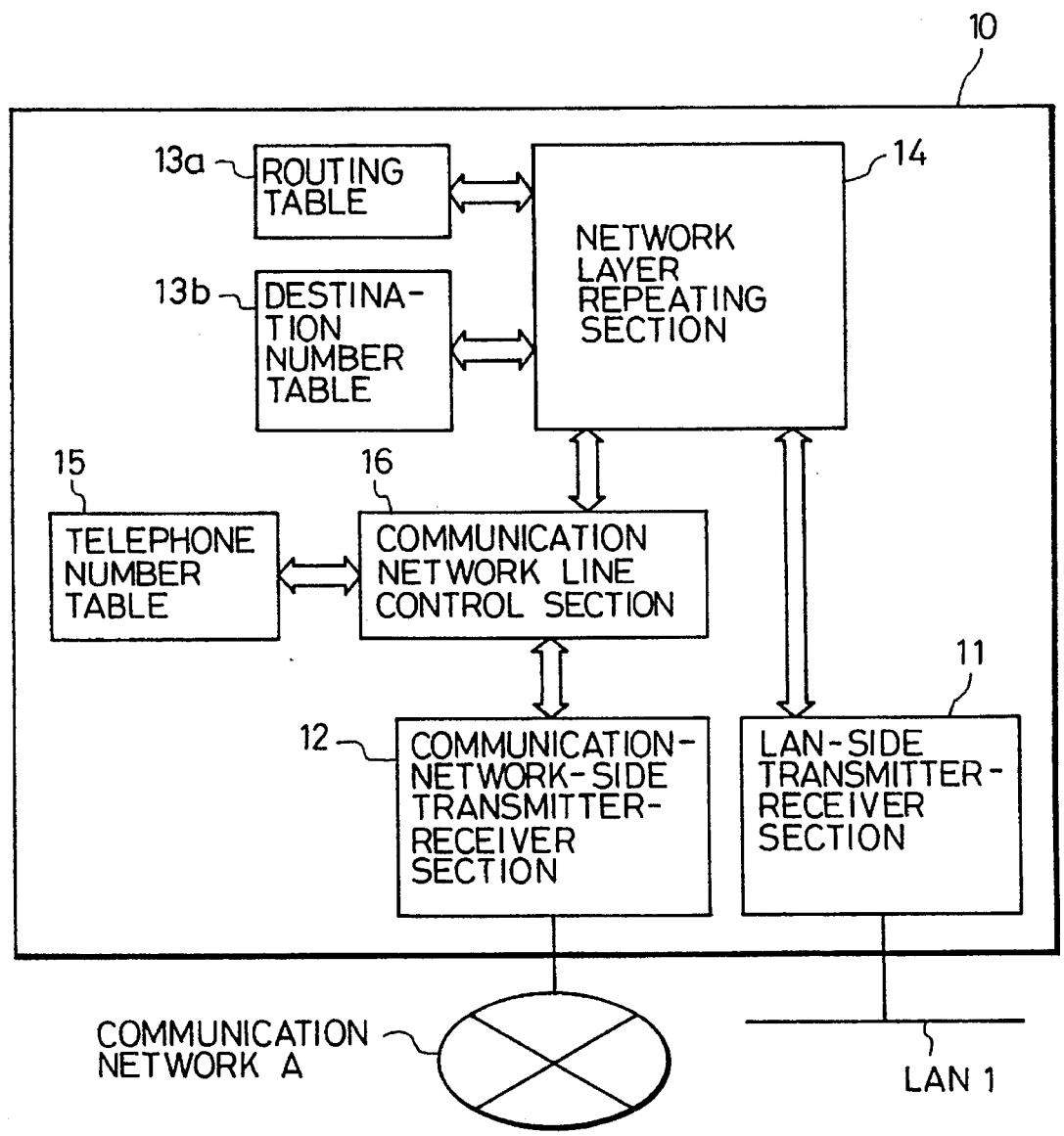
FIG. 3 is a block diagram showing an embodiment of a specific arrangement of the data repeating apparatus according to the invention.

FIG. 3 is a block diagram showing an embodiment of a specific arrangement of the repeating apparatus (router) according to the present invention.

Referring to FIG. 3, an LAN-side transmitter-receiver section, communication-network-side transmitter-receiver section, network layer repeating section, and communication network line control section correspond to the LAN-side transmitter-receiver means 11, communication-network-side transmitter-receiver means 12, sampling means 14, and line control means 16, respectively, shown in FIG. 1. For ease of illustration, therefore, like reference numerals are used to designate like means and sections in FIGS. 1 and 3.

Further, a routing table and a destination number table constitute a specific example of the first storage means 13, while a telephone number table is a specific example of the second storage means 15. In FIG. 3, the routing table, destination number table, and telephone number table are denoted by 13a, 13b and 15, respectively. Set in the routing table 13a are remote-side gateway addresses corresponding to those destination network addresses which can be connected directly through the communication network A. Telephone number indexes (specific examples of which will be mentioned later) corresponding to the gateways are set in the destination number table 13b. Telephone numbers corresponding to destination indexes (specific examples of which will be mentioned later) are set in the telephone number table 15.

Figure 4:
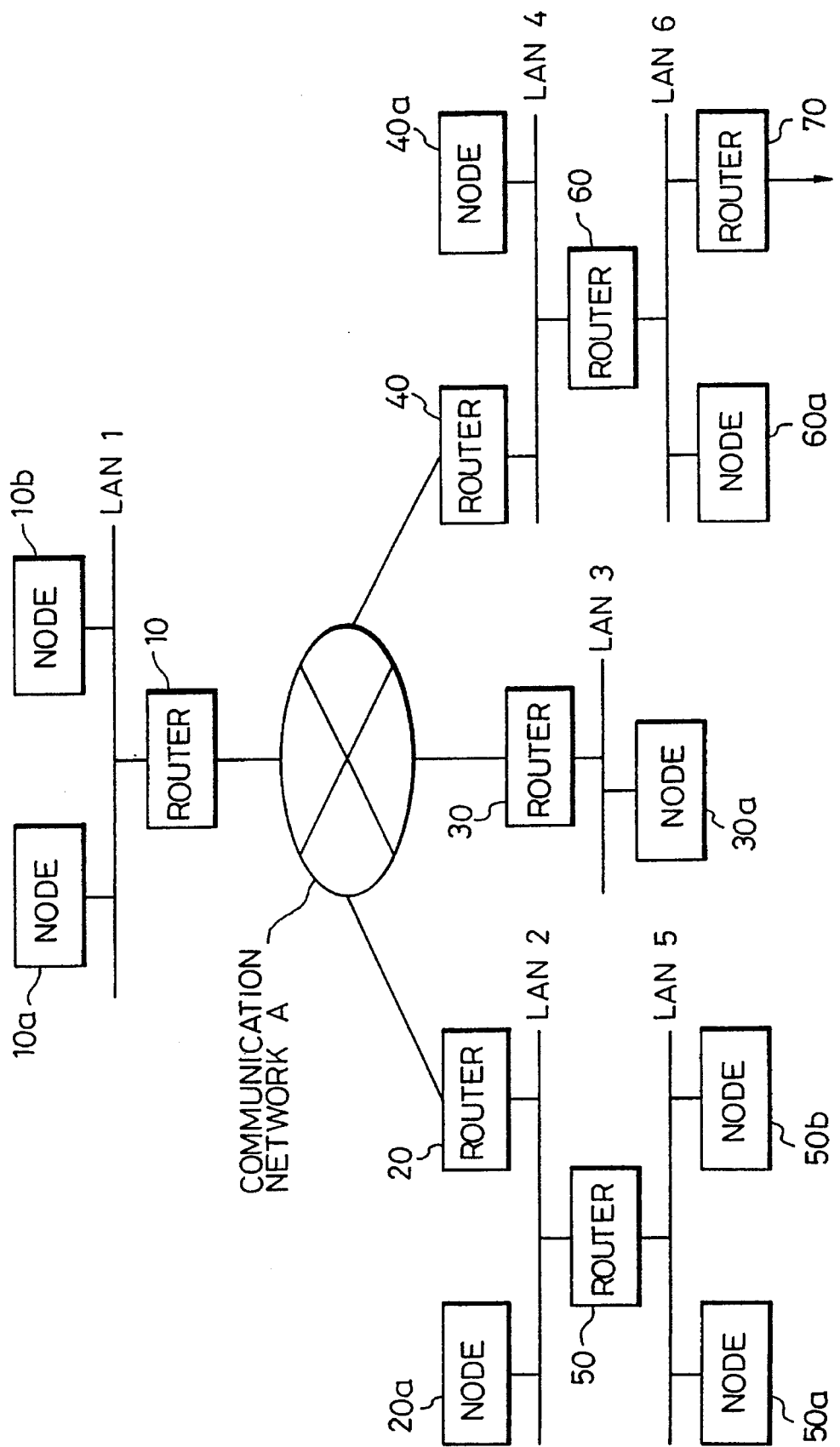
FIG. 4 is a diagram showing a first embodiment in which the repeating apparatus according to the invention is used in a system such that a plurality of LANs are connected to one another through a communication network.

FIG. 4 is a diagram showing a first embodiment in which the router 10 is used in a system such that a plurality of LANs are connected to one another through the communication network A.

Referring to FIG. 4, an LAN 1 is connected with nodes 10a and 10b, for use as terminal stations, and the router 10; an LAN 2 with a node 20a and routers 20 and 50; an LAN 3 with a node 30a and a router 30; an LAN 4 with a node 40a and routers 40 and 60; an LAN 5 with nodes 50a and 50b and the router 50; and an LAN 6 with a node 60a, the router 60, and a router 70.

These individual routers fulfill the functions described with reference to FIG. 1, and besides, exchange routing information with other routers in accordance with a protocol (hereinafter referred to as "routing protocol") for the exchange of set routing information. Thus, when the topology of the network is modified, the routers deliver the routing information to the other routers. When these other routers obtain the routing information, they can detect thereby the modification of the topology of the network and modify the addresses of the routing table 13a. While this routing information exchange normally is carried out at regular intervals, the communication network involves the problem of charging. In the data repeating apparatus according to this embodiment, therefore, the routing protocol is set so that the routing information is delivered when the topology of the network is modified. Thus, this repeating apparatus can obviate the necessity of periodical exchange of the routing information.

In the data repeating apparatus according to the present invention, moreover, the routing protocol can be set so that route information obtained by the routing information exchange should not be subjected to timer control. Once the LANs are connected to one another, therefore, the communication network is automatically connected so that data from the node or nodes on each LAN can be relayed to the other LANs, without manually setting the routing information, thereafter.

Set in the routing table 13a of the router 10, as mentioned before, are the remote-side gateway addresses corresponding to the destination network addresses which can be connected directly through the communication network A. Table 1 shows a specific example of the table 13a for the case of the system configuration shown in FIG. 4.

TABLE 1

| Destination Network Address | Gateway address |
| --- | --- |
| Address of LAN 2 | Address of router 20 |
| Address of LAN 3 | Address of router 30 |
| Address of LAN 4 | Address of router 40 |

As mentioned before, moreover, the telephone number indexes corresponding to the gateways are set in the destination number table 13b. Table 2 shows a specific example of the table 13b for the case of the system configuration shown in FIG. 4.

TABLE 2

| Gateway Address | Telephone number index |
| --- | --- |
| Address of Router 20 | 1 |
| Address of Router 30 | 2 |
| Address of Router 40 | 3 |

As mentioned before, furthermore, the telephone numbers corresponding to the destination indexes are set in the telephone number table 15. Table 3 shows a specific example of the table 15 for the case of the system configuration shown in FIG. 4.

TABLE 3

| Destination Index | Telephone number |
| --- | --- |
| 1 | 0123-45-6789 |
| 2 | 12-3456-7890 |
| 3 | 234-567-8901 |

The following is a description of a case in which the node 10a transmits a frame to the node 20a in FIG. 4, for example.

First, when the LAN-side transmitter-receiver 11 receives the frame from the node 10a, the network layer repeating section 14 in the router 10 searches the routing table 13a shown in Table 1 in accordance with the destination network address in this frame. The repeating section 14 detects that the destination network address in this frame is identical with the network address of the LAN 2 in the routing table 13a, and decides to relay the frame to the router 20. Then, the repeating section 14 searches the destination number table 13b shown in Table 2. Thereupon, the network layer repeating section 14 detects that the index of a telephone number to be connected to the router 20 is "1", and delivers the index "1" to the communication network line control section 16.

On receiving the index "1", the communication network line control section 16 obtains a telephone number "0123-45-6789" corresponding to the index "1" from the telephone number table 15 shown in Table 3, thereby establishing a call. The communication-network-side transmitter-receiver section 12 relays this frame to the router 20.

When the communication-network-side transmitter-receiver section receives the frame, in the router 20, the network layer repeating section recognizes that the frame received from the destination node address is a frame destined for the node 20a, and relays this frame to the LAN 2 through the LAN-side transmitter-receiver section.

Thus, in this embodiment, the frame is automatically transmitted from the node 10a to the node 20a. According to this embodiment, moreover, frames destined for the node 30a on the LAN 3 and the node 40a on the LAN 4 can be relayed by automatically establishing a call of the communication network A.

The following is a description of a case in which another router separate from the one connected to the communication network is connected to the LAN on the remote side, and a frame for the next network is relayed.

In this connection, Table 4 shows a preferred specific example of the routing table 13a for the case of the system configuration shown in FIG. 4.

TABLE 4

| Destination Network Address | Gateway address |
| --- | --- |
| Address of LAN 2 | Address of router 20 |
| Address of LAN 3 | Address of router 30 |
| Address of LAN 4 | Address of router 40 |
| Address of LAN 5 | Address of router 20 |
| Address of LAN 6 | Address of router 40 |

Normally, the routers exchange routing information by utilizing the routing protocol in the aforesaid manner. In this embodiment, the routing information shown in Table 4 is prepared for the routing table 13a of the router 10 in accordance with the routing protocol by obtaining routing information from the routers 20 and 40 on the other side of the communication network A.

In the case where the node 10a transmits a frame to the node 50a, for example, the router 10 searches the routing table 13a shown in Table 4 in accordance with the destination network address in the received frame. Then, the router 10 detects that this destination network address is identical with the network address of the LAN 5 in Table 4, and decides to relay the frame to the router 20.

Then, the router 10 searches the destination number table 13b shown in Table 2, and detects that the index of the telephone number to be connected to the router 20 is "1". Further, the router 10 obtains the telephone number "0123-45-6789" from the telephone number table 15 shown in Table 3, thereby establishing a call, and relays this frame to the router 20 through the communication network A.

On receiving this frame, the router 20 recognizes that the frame received from the destination network address is a frame destined for the LAN 5, and relays this frame to the router 50 through the LAN 2. On receiving this frame, the router 50 recognizes that the frame received from the destination network address is a frame destined for the node 50a, and relays this frame to the LAN 5.

Thus, routing information for the LAN 5 can be automatically set in the routing table of each router without being set manually, so that the frame transmission from the node 10a to the node 50a is easy. Likewise, a frame destined for the node 60a on the LAN 6 can be relayed by automatically establishing a call of the communication network A.

Operation for the case where the topology of the network is changed will now be described.

Figure 5:
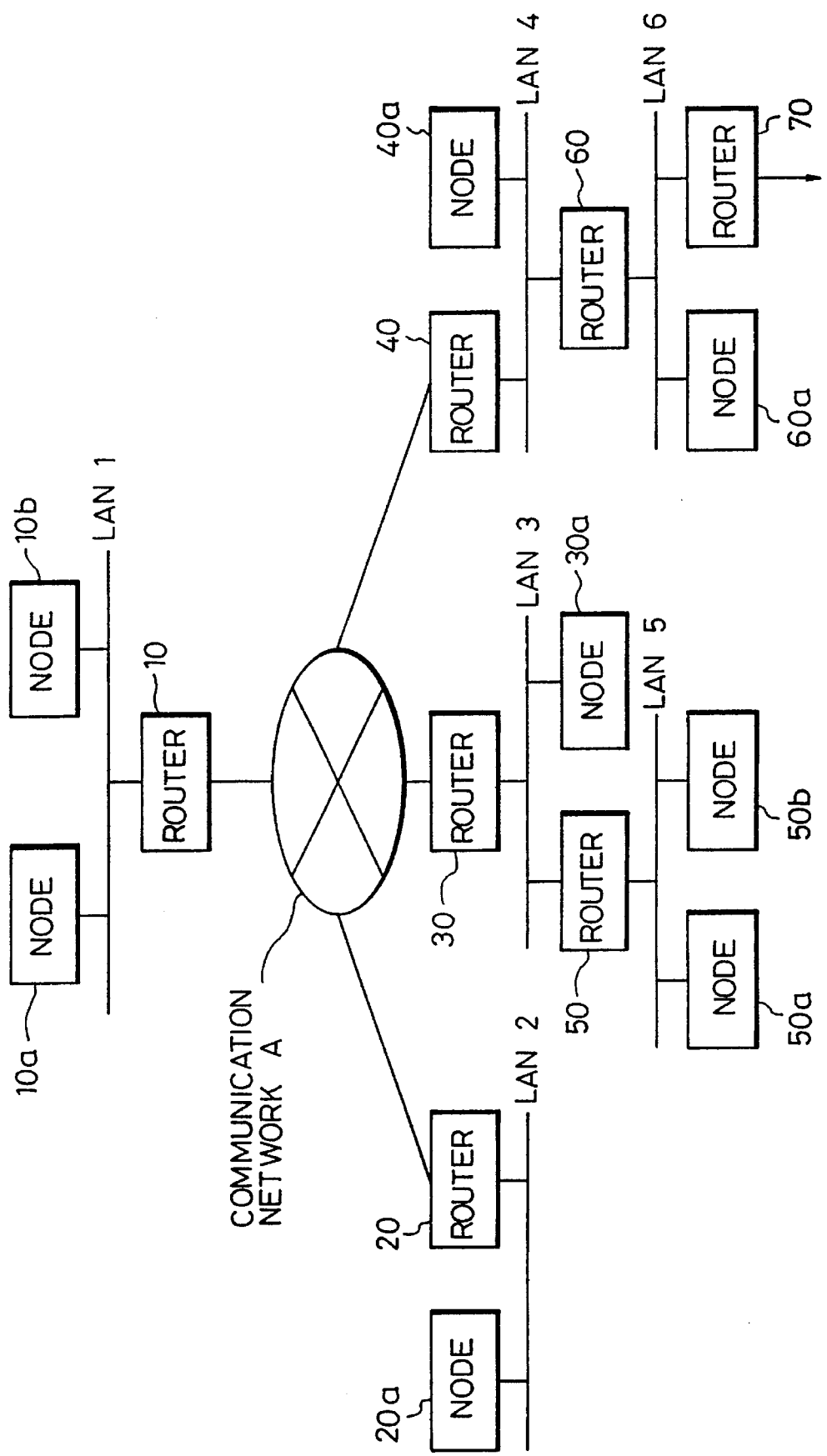
FIG. 5 is a diagram showing a second embodiment in which the repeating apparatus according to the invention is used in the same system.

The following is a description of case in which the LAN 5 of the first embodiment shown in FIG. 4 is shiftingly connected to the LAN 3 through the router 50, as in the case of a second embodiment shown in FIG. 5. In this embodiment, the routing protocol is set so that the routing information can be changed at regular intervals.

When the router 50 is shiftingly connected to the LAN 3, the router 20 ceases to receive the routing information from the router 50, in the LAN 2. Accordingly, the router 20 concludes that there is no route to the LAN 5, judging from the routing protocol, and delivers information to that effect to the router 10.

On the other hand, the routing information for the LAN 5 is applied to the router 30 from the router 50 through the LAN 3. Thus, the router 30 concludes that a route to the LAN 5 is accessible, judging from the routing protocol, and delivers information to that effect to the router 10.

The routing information for the LAN 5 is applied to the router 10 from the routers 20 and 30 on the other side of the communication network A. Based on these pieces of routing information, the router 10 modifies the routing information in the routing table 13*a* shown in Table 1 into routing information shown in Table 5 below.

TABLE 5

| Destination Network Address | Gateway address |
| --- | --- |
| Address of LAN 2 | Address of router 20 |
| Address of LAN 3 | Address of router 30 |
| Address of LAN 4 | Address of router 40 |
| Address of LAN 5 | Address of router 30 |
| Address of LAN 6 | Address of router 40 |

Then, in transmitting a frame from the node 10*a* on the LAN 1 to the node 50*a* on the LAN 5, the router 10 decides to relay the frame to the router 30 in accordance with the destination network address (address of LAN 5) in the received frame. Then, the router 10 obtains a telephone number "12-3456-7890" (see Table 3) from the telephone number table 15, thereby establishing a call, and relays this frame to the router 30.

On receiving the frame, the router 30 recognizes that the frame received from the destination network address is a frame destined for the LAN 5, and relays this frame to the router 50 through the LAN 2.

On receiving this frame, the router 50 recognizes that the frame received from the destination network address is a frame destined for the node 50*a*, and relays this frame to the LAN 5.

In order to facilitate the route setting and maintenance for reciprocal connection in a large-scale network, according to this embodiment, the network layer addresses and telephone numbers on the directly connected sides are set on the table for each router in connecting a plurality of LANs through the communication network. Thus, in this embodiment, frames for nodes on subsequent networks can be relayed through the nodes on the opposite LANs and the LANs on the other side, by automatically connecting the communication network.

What is claimed is:

1. A router for establishing connection among a plurality of LANs (Local Area Networks) via a data communication network to relay network layer data, each of said plurality of LANs including at least one said router, each said router comprising:

first storage means including a routing table for storing gateway addresses corresponding to destination LAN addresses, and a destination number table for storing indexes corresponding to the gateway addresses;

second storage means for storing numbers corresponding to the indexes;

sampling means for, upon receiving network layer data to be relayed to a destination LAN, fetching from the routing table a gateway address corresponding to a destination LAN address included in the received network layer data, and for fetching from the destination number table an index corresponding to the fetched gateway address; and line control means for fetching from said second storage means a number corresponding to the index fetched by said sampling means, and for establishing, in accordance with the fetched number, a connection to a router of the destination LAN via the communication network.

2. The router according to claim 1, wherein each of the numbers stored in said second storage means comprises a telephone number.

\* \* \* \* \*